H. T. Barker,
Box Fastener.
N° 55,455. Patented June 12, 1866.
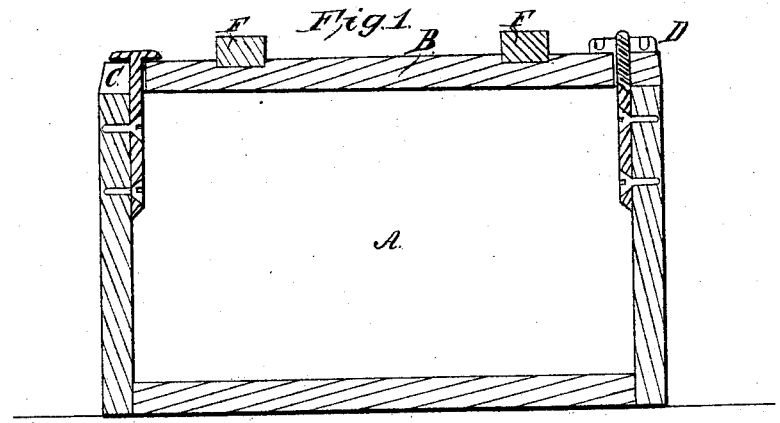
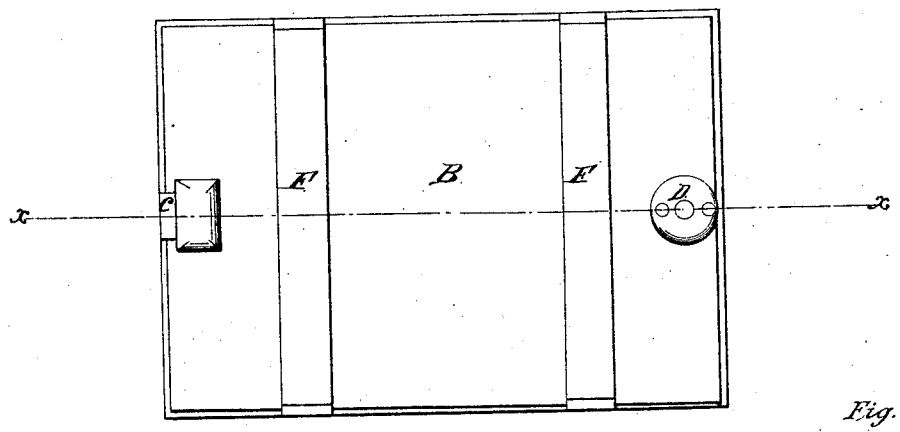
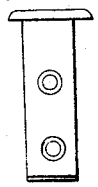
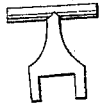
Witnesses:
Inventor:
H. T. Barker
By Munn &
Attorneys

UNITED STATES PATENT OFFICE.

HENRY T. BARKER, OF NAPA, CALIFORNIA.

IMPROVEMENT IN FASTENINGS FOR FRUIT-BOXES.

Specification forming part of Letters Patent No. 55,455, dated June 12, 1866.

*To all whom it may concern:*

Be it known that I, HENRY T. BARKER, of the city and county of Napa, and State of California, have invented certain new and useful Improvements in Fastenings for Boxes, especially adapted for Fruit-Boxes; and I do hereby declare that the following is a full, clear, and exact description of the nature, construction, and operation of the same, sufficient to enable one skilled in the art to which it appertains to understand and use the same, reference being had to the accompanying drawings, which are made part of this specification, and in which—

Figure 1 is a central vertical section on the line $x\,x$, Fig. 2. Fig. 2 is a plan or top view. Fig. 3 is an elevation of the catch at one end of the box, and Fig. 4 is an elevation of the screw-fastening at the other end of the box.

The same letters refer to corresponding parts in the different figures.

The invention consists of a ready and secure method of fastening the lids on boxes so that they may be attached quickly and remain fastened and be capable of ready removal, and my invention is especially designed for fruit and other produce which is shipped in them to market, the boxes, after emptying, being returned whence they came, to be reinvested with fruit or other produce, as the case may be. This frequent closing and unclosing, with the ordinary methods of fastening, splits and destroys the boxes, causing destruction and waste.

A is the box and B the lid. One end of the box has a catch-like fastening, Fig. 3, secured to it, having a projecting head which lies upon the top of the lid, while the shank of the same occupies a slot, C, in the lid.

To the other end of the box is attached a device, Fig. 4, the threaded end of which passes through an opening in the lid, and, projecting above it, has a nut, D, screwed down upon it, securing the lid in position.

To secure the lid in position the slotted end is first introduced under the projecting flange of the head of the catch, Fig. 3. The other end is then pressed down so that the lid is fairly in position, when the nut D is screwed down upon the thread of the bolt, Fig. 4, by means of the wrench, Fig. 5.

As the boxes are piled upon each other the battens F on the lid project above the fastenings and enable the boxes to set securely on each other.

The headed catch, Fig. 3, and the threaded bolt, Fig. 4, are attached to the respective ends of the boxes by screws or other device.

Having described my invention, what I claim therein as new, and desire to secure by Letters Patent, is—

The arrangement shown and described, consisting of the headed catch at the slotted end of the lid and the threaded bolt at the other end, upon which the lid is secured by the nut.

H. T. BARKER.

Witnesses:
A. A. HUNNEWELL,
R. N. STEEN.